(12) United States Patent
Holtmanns et al.

(10) Patent No.: US 9,198,026 B2
(45) Date of Patent: Nov. 24, 2015

(54) SIM LOCK FOR MULTI-SIM ENVIRONMENT

(75) Inventors: Silke Holtmanns, Klaukkala (FI); Rune Lindholm, Sottunga (FI)

(73) Assignee: Nokia Technologies Oy, Espoo (FI)

( * ) Notice: Subject to any disclaimer, the term of this patent is extended or adjusted under 35 U.S.C. 154(b) by 358 days.

(21) Appl. No.: 13/466,382

(22) Filed: May 8, 2012

(65) Prior Publication Data

US 2012/0289197 A1 Nov. 15, 2012

Related U.S. Application Data

(60) Provisional application No. 61/483,939, filed on May 9, 2011.

(51) Int. Cl.
*H04M 1/66* (2006.01)
*H04W 8/18* (2009.01)
*H04M 1/675* (2006.01)
*H04M 1/725* (2006.01)
*H04W 12/08* (2009.01)

(52) U.S. Cl.
CPC .............. *H04W 8/183* (2013.01); *H04M 1/675* (2013.01); *H04M 1/72522* (2013.01); *H04W 12/08* (2013.01)

(58) Field of Classification Search
CPC ............................... H04W 12/12; H04W 12/08
See application file for complete search history.

(56) References Cited

U.S. PATENT DOCUMENTS

| 6,178,335 | B1 | 1/2001 | Vu | |
|---|---|---|---|---|
| 2004/0192386 | A1* | 9/2004 | Aerrabotu et al. | 455/558 |
| 2007/0184858 | A1* | 8/2007 | Landschaft et al. | 455/466 |
| 2008/0090614 | A1* | 4/2008 | Sicher et al. | 455/558 |

(Continued)

FOREIGN PATENT DOCUMENTS

| EP | 1 059 822 A2 | 12/2000 |
|---|---|---|
| WO | WO 2009/001628 A1 | 12/2008 |

OTHER PUBLICATIONS

"3rd Generation Partnership Project; Technical Specification Group Core Network and Terminals; UICC-terminal interface; Universal Subscriber Identity Module (USIM) application test specification (Release 10)", 3GPP TS 31.121 V10.0.0, Apr. 2011, 287 pgs.

(Continued)

*Primary Examiner* — Vladimir Magloire
*Assistant Examiner* — Shantell L Heiber
(74) *Attorney, Agent, or Firm* — Harrington & Smith

(57) ABSTRACT

An apparatus with a memory and computer program code configured, with a processor, to start an application; to read a file from a first subscriber module and to determine if there is an active subscriber module lock of the first subscriber module; in response to determining that there is an active subscriber module lock of the first subscriber module executing the application; otherwise if it is determined that there is not an active subscriber module lock of the first subscriber module, to determine if there is an active subscriber module lock of a second subscriber module and continuing until an active subscriber module lock of another subscriber module is determined, and then executing the application using that subscriber module having the active subscriber module lock, otherwise terminating the method without executing the application if no active subscriber module lock of any other subscriber module is determined to be present.

21 Claims, 3 Drawing Sheets

(56) References Cited

U.S. PATENT DOCUMENTS

2010/0151854 A1* 6/2010 Wang .................. 455/432.1
2012/0058743 A1* 3/2012 Chen ..................... 455/411

OTHER PUBLICATIONS

"3rd Generation Partnership Project; Technical Specification Group Core Network and Terminals' Characteristics of the Universal subscriber Identity Module (USIM) application (Release 10)", 3GPP TS 31.102 V10.1.0, Apr. 2011, 227 pgs.

3GPP TR 36.912 V9.3.0 (Jun. 2010), Technical Report, 3rd Generation Partnership Project; Technical Specification Group Radio Access Network; Feasibility Study for Further Advancements for E-UTRA (LTE-Advanced), (Release 9), (61 pages).

3GPP TR 36.913 V9.0.0 (Dec. 2009), Technical Report, 3rd Generation Partnership Project; Technical Specification Group Radio Access Network; Requirements for Further Advancements for Evolved Universal Terrestrial Radio Access (E-UTRA) (LTE-Advanced), (Release 9), (15 pages).

3rd Generation Partnership Project; Technical Specification Group Services and System Aspects; Personalisation of Mobile Equipment (ME); Mobile functionality specification (Release 10). 3GPP Standard; 3GPP TS 22.022, 3rd Generation Partnership Project (3GPP) Mobile Competence Centre; 650, Route Des Lucioles; F-06921 Sophia-Antipolis Cedex; France No. V10.0., Apr. 8, 2011 pp. 1-23, XP050477323.

Qualcomm Incorporated : AT Command for Supporting Multiple Cards Installed in a ME, 3GPP Draft; C1-103556-C1-103415-C1-103084-27007-A00-MU Ltiple-Cards, 3rd Generation Partnership Project (3GPP), Mobile Competence Centre; 650 Route Des Lucioles; F-06921 Sophia-Antipolis Cedex; France, Vol CT WG1 no Xian; 20100823, Aug. 27, 2010, XP050444202.

* cited by examiner

SIM LOCK FOR MULTI-SIM ENVIRONMENT

CLAIM OF PRIORITY FROM COPENDING PROVISIONAL PATENT APPLICATION

This patent application claims priority under 35 U.S.C. §119(e) from Provisional Patent Application No. 61/483,939, filed May 9, 2011, the disclosure of which is incorporated by reference herein in its entirety including the various Exhibits that were attached thereto.

TECHNICAL FIELD

The exemplary embodiments of this invention relate generally to mobile communication devices and methods and, more specifically, relate to subscriber identity modules.

BACKGROUND

The following abbreviations are defined as follows:
CSIM CDMA subscriber identity module
EF elementary file
ETSI European Telecommunications Standards Institute
IMSI international mobile subscriber identity
ISIM international subscriber identity module
MNO mobile network operator
R-UIM removable user identity module
SCP smart card platform
SIM subscriber identity module
UICC universal integrated circuit card
eUICC embedded universal integrated circuit card
USIM universal subscriber identity module ETSI SCP embedded UICC had several contributions to have a multitude of "subscriptions" in an embedded UICC. Reference in this regard can be made to ETSI TC SCP REQ ad hoc #113 LONDON, GB, 27-28 Apr. 2011, Tdoc SCPREQ (11)0043 CHANGE REQUEST 102 412 CR Current version: 10.x.y,. For example, in REQ-11-X-02-10 [~LIF10] it is said that a MNO shall have the ability to declare whether it permits an eUICC to hold its network and eUICC access credentials alongside those of other MNOs (mobile network operators) when its access credentials are not active, or in the case where it is the active MNO, whether other access credentials can be stored.

As a general reference one can consult, for example, 3GPP TS 22.022 V 10.0.0 (2011-03) Technical Specification 3rd Generation Partnership Project; Technical Specification Group Services and System Aspects; Personalisation of Mobile Equipment (ME); Mobile functionality specification (Release 10). This document describes SIM locking and unlocking in 3GPP.

Reference can also be made to 3GPP TS 31.121 V10.0.0 (2011-04) Technical Specification 3rd Generation Partnership Project; Technical Specification Group Core Network and Terminals; UICC-terminal interface; Universal Subscriber Identity Module (USIM) application test specification (Release 10).

Reference can also be made to 3GPP TS 31.102 V10.1.0 (2011-04) Technical Specification 3rd Generation Partnership Project; Technical Specification Group Core Network and Terminals; Characteristics of the Universal Subscriber Identity Module (USIM) application (Release 10).

SUMMARY

In a first aspect thereof the exemplary embodiments of this invention provide a method that comprises starting an application in a wireless communication device; reading a file from a first subscriber module and determining if there is an active subscriber module lock of the first subscriber module; if it is determined that there is an active subscriber module lock of the first subscriber module then executing the application using the first subscriber module; else, if it is determined that there is not an active subscriber module lock of the first subscriber module, then determining if there is an active subscriber module lock of a second subscriber module and continuing until an active subscriber module lock of another subscriber module is determined, and then executing the application using that subscriber module having the active subscriber module lock, otherwise terminating the method without executing the application if no active subscriber module lock of any other subscriber module is determined to be present.

In another aspect thereof the exemplary embodiments of this invention provide an apparatus that comprises a processor and a memory including computer program code. The memory and computer program code are configured, with the processor, to cause the apparatus at least to start an application in a wireless communication device; to read a file from a first subscriber module and to determine if there is an active subscriber module lock of the first subscriber module; in response to determining that there is an active subscriber module lock of the first subscriber module executing the application using the first subscriber module; otherwise if it is determined that there is not an active subscriber module lock of the first subscriber module, to determine if there is an active subscriber module lock of a second subscriber module and continuing until an active subscriber module lock of another subscriber module is determined, and then using executing the application using that subscriber module having the active subscriber module lock, otherwise terminating the method without executing the application if no active subscriber module lock of any other subscriber module is determined to be present.

In another aspect thereof the exemplary embodiments of this invention provide an apparatus that comprises means for starting a telecommunication application; means for reading an EF_IMSI file from a first USIM and validating a presence of a SIM Lock of the first USIM; means, responsive to finding an active SIM Lock, for using use the first USIM; and means, responsive to no active SIM Lock being found, for determining if there is another USIM to check and if there is then the means for reading is activated to examine a next USIM.

BRIEF DESCRIPTION OF THE DRAWINGS

Aspects of the embodiments of this invention are found in the following Detailed Description, when read in conjunction with the attached Drawing Figures, wherein.

DETAILED DESCRIPTION

The SIM lock was originally designed to be used with one physical card in a device such as a phone where only applications from one operator reside. This card is owned and issued by one operator. The appearance of devices or machines that have several subscriptions on board, and where the subscriptions are not necessarily owned and fully controlled by a single owner, may be detrimental to the operator's business model. A secure module that holds the subscriptions (USIM/ISIM/CSIM or SIM and related data) should be able to be used for other applications such as banking, ticketing, WLAN and so forth, even with a SIM lock for the cellular subscription in place. On the other hand it should be possible for an operator that has a contract with a user and subsidizes the user's phone to avoid the ability to use other USIMs during a contractual "blackout" period.

A problem that arises is how a SIM Lock should operate in a "multi-SIM" environment, i.e., how can a SIM Lock be applied when there is the possibility "just to download" another subscription and potentially use it. The problem also arises in a terminal that has more than one SIM card slot, or that has a SIM card slot and an embedded chip that holds subscriptions.

The exemplary embodiments of this invention provide methods and apparatus to extend the current concept of a SIM lock to a multi-SIM environment.

The exemplary embodiments further enable a user to have a subsidized phone (and hence the user cannot use the phone for another operator in the contractual period), but to also use the secure module for other kinds of applications such as banking or ticketing.

Figure 1:
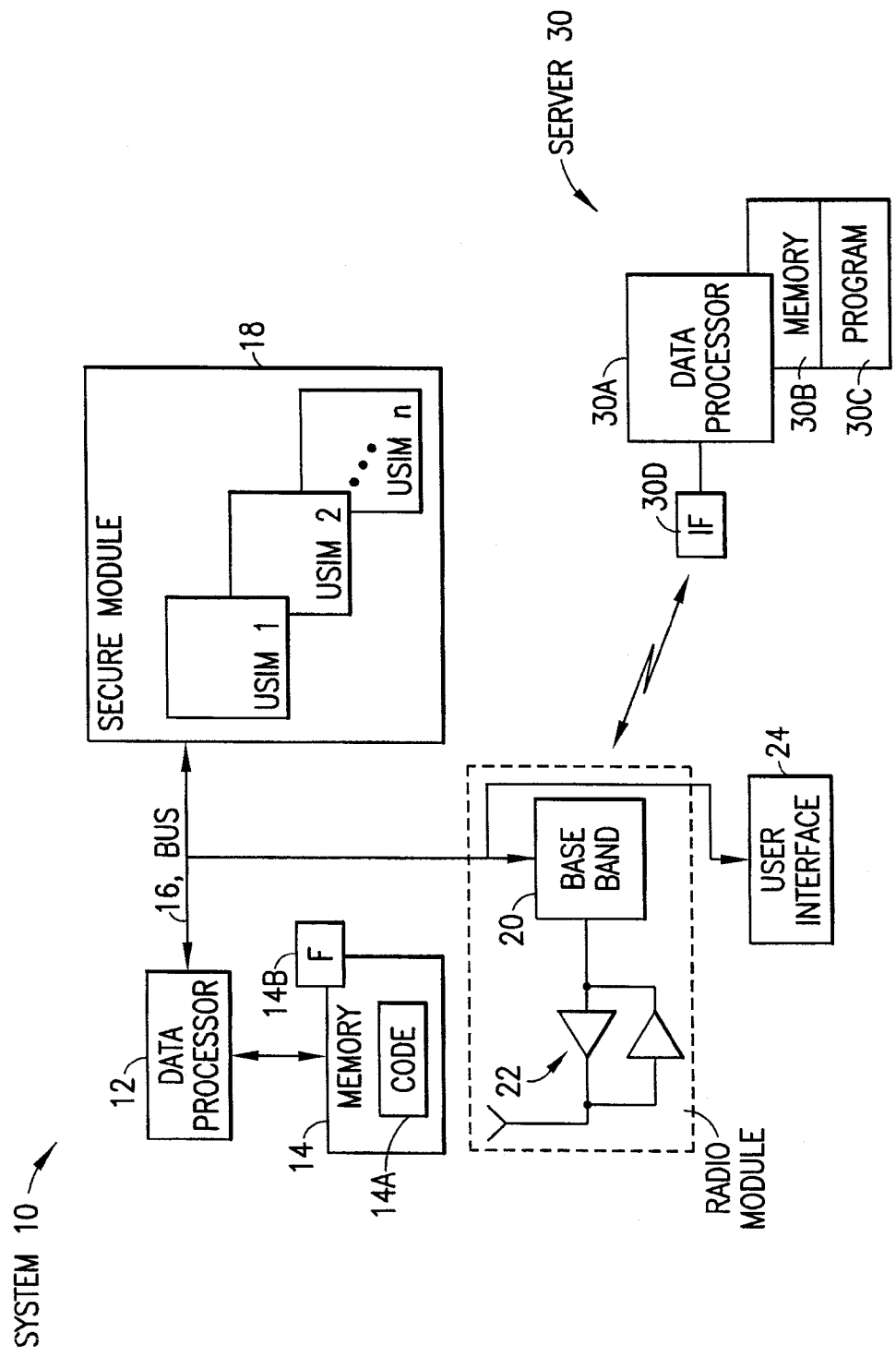
FIG. 1 is simplified block diagram of a mobile equipment that includes a multi SIM such as a security module that contains more than one subscriptions.

FIG. 1 is a block diagram of a system, such as a mobile system 10 (e.g., cellular phone, smart phone, tablet, PDA, etc.) having at least one data processor 12, at least one memory 14 (e.g., DRAM or DRAM in combination with SRAM) that stores computer program code (instructions) 14A for execution by the data processor 12 as well as data that is used/generated during execution of the program code 14A. The mobile system 10 may further include at least one data/address/command bus 16 and, connected to the bus 16, a secure module 18 that stores a plurality of subscriber modules, such as for example USIMs (USIM1, USIM2, ..., USIMn). At least the secure module 10 is operated in accordance with the exemplary embodiments of this invention. The secure module 18 can be in the form of a plug-in card or it can be embedded in the system 10. In some embodiments there can be but one secure module 18 (physical entity) that stores a plurality of co-located USIMs, while in other embodiments there can be a plurality of secure modules each storing an associated (distributed) USIM. In general, the examples of the embodiments of this invention use the USIM, but they also apply in the same manner to other SIM-type applications, e.g., ISIM, CSIM or R-UIM. The term USIM is used in general, as not as a limitation, to describe a network access application containing credentials, algorithms and related data (e.g., configuration data).

The system 10 may also include other components including, by example, one or more radio modules each including at least one wireless transceiver 20 and related baseband (BB) circuitry 22, as well as appropriate user interface (UI) components 24 such as a touch-sensitive display screen, microphone and speaker(s). In some embodiments the UI components 24 can be employed by a user to enter a personal identification number (PIN). Other components, including one or more cameras, can also be present depending on the specifics of the system 10.

The various components depicted can be implemented as discrete packages. Alternatively one or more, or all, of these components can be integrated into a single package, such as in a system-on-a-chip (SOC) type of package.

By way of introduction one current SIM Lock technique operates as follows.
(A) Reset the SIM card.
(B) Start a telecommunication application USIM/ISIM on the card.
(C) Wait for a PIN code if needed.
(D) Read the EF_IMSI and validate the SIM Lock.
(E) If the SIMLOCK is OK then proceed, otherwise stop.

When these steps are successfully performed the SIM card and other applications can be used and no further checking of SIM Lock is performed. After the telecommunication application has been checked the terminal does not check any other applications.

The EF_IMSI referenced above comprises the following three elements: Mobile Country Code (MCC), Mobile Network Code (MNC) and Mobile Subscriber Identification Number (MSIN). The MCC has three digits and indicates a country code of a mobile communication network to which the subscriber belongs (i.e., the subscriber's home country). The MNC has two or three digits and indicates a network code of a mobile communication network to which the subscriber belongs (i.e., the subscriber's home network). An MSISDN indicates a unique number (e.g., the telephone number) identifying the mobile device in the mobile communication network to which the subscriber belongs. Some operators use also other means of identifying a subscriber. e.g., a chip identifier ICC_ID.

Regarding the starting of other applications; the starting is performed in response to a user request. The telecommunication application may be launched immediately and other applications will only be started if some UI client makes a request to start the application. The UI client(s) may start whatever application they desire, as the lower layer software does not know the applications or the criteria for starting them and, furthermore, the UI client has sole ownership of the application. The presence of a single SIM card is assumed.

It should be noted that if there is another USIM/ISIM application by another operator in the terminal (on a UICC or in an embedded chip), then there would be no further checking when the other USIM/ISIM application is activated. This implies that if it is desirable to support several USIM/ISIM then the current process needs to be revised in order to enforce a SIM Lock condition. For the purposes of understanding the terminology, a SIM card is a 2G (second generation) smart card, and a UICC card is a smart card which contains network access credentials and the corresponding applications, e.g., SIM application, USIM application, ISIM application, C-SIM application. As such, and even though the detailed description of this invention makes repeated references to the "USIM", it should be understood that this is only one potential application, and that reference could also be made to C-SIM or any other type of (e.g., cellular) network access credentials and related data such as, but not limited to, algorithms and configuration data.

The exemplary embodiments of this invention provide a mechanism to change the phone (e.g., the mobile system 10) set-up to be able to enforce a SIM Lock in a multi-SIM capable phone (e.g., one that is subsidized by a particular operator). A multi-SIM enabled phone is a mobile phone which is able to hold more than one USIM application (e.g., UICC or embedded chip or both). The embodiments of this invention are applicable to systems (e.g., phones) where the USIM/ISIM applications are co-located, as well as to systems where the USIM/ISIM applications are distributed (reside) on or in different physical entities.

A server 30 shown in FIG. 1 that provides the USIM application and related data could be instructed by the operator to not provision another USIM application and the control would be exercised in the network. However this "server solution" approach would quickly become unwieldy if there are many servers operated by many different companies in different regions. A server solution would imply that one regional server would give "instructions" to another regional server not to provide a USIM application, which would also require necessary interfaces and political acceptance. However, such a network-based solution may be deployed in addition to the terminal-based multi-SIM lock.

It should thus be appreciated that the exemplary embodiments of this invention are also applicable to this "server solution" scenario, where the control and enforcement of the operator policy takes place at least in part in some externally provided subscription provisioning server, such as the server 30 shown in FIG. 1, and in this case can be considered to form a second layer of defense.

The server 30 may be assumed to include local data processing capability embodied in at least one data processor 30A connected with at least one memory 30B storing applicable server computer program code 30C. The server 30 will also include some type of interface (IF) 30D for communicating with the mobile device 10. The interface 30D may be implemented as one or more of a wired interface and a wireless interface, such as a wireless interface one made via a network operator radio infrastructure.

One exemplary usage scenario is as follows.

A user buys a phone with a contract which is subsidized by the operator. The phone is multi-SIM capable, i.e., it can contain more than one USIM/ISIM application. Described now is a procedure to prevent another USIM from being used during the contractual time agreed to by the user with the network operator.

Consider the following possible scenarios:
all USIM/ISIM are on one physical entity;
the USIM/ISIM applications are on different physical entities;
a USIM application has a related SIM Lock; and
there may be more than one radio module in the system 10 of FIG. 1 (or two or more USIMs may time multiplex the use of a single radio module).

In one possible embodiment the SIM Lock control can be placed in the radio module. However this approach may be problematic if there is more than one radio module as the radio module may need to check each incoming request for a radio resource and may need to validate that this incoming request is not coming from a USIM application that is not allowed to communicate via the radio module.

In another, more preferred, approach described below, a check is made of all SIM (USIM, ISIM, CSIM, etc.) when booting up the system 10.

In a further more preferred approach described below USIM Locks are tracked by the use of a flag.

Also described is a procedure for unlocking in the multi-SIM environment.

In these various cases it is assumed that there is some form of a controller entity that can be embodied as a software module that starts and executes the process. This controller entity can be implemented as a software module that forms a part of the program code 14A shown in FIG. 1.

Approach A:
1) Start a telecommunication application 1, i.e., USIM1.
2) Wait for the PIN (if needed).
3) Read the EF_IMSI file and validate the SIM Lock of USIM1.
4) If there is an active SIM Lock, use the USIM1. If there is no active SIM Lock, then check the next USIM or USIM2 (i.e., jump to Step 3 for USIM2). This process is repeated for all USIMs (USIM1 through USIMn in FIG. 1).

When an active SIM Lock is found then that USIM is the one that is used during operation of the phone.

Approach B:
As was noted above in conventional practice the phone checks the SIM Lock only when the SIM card is started. In accordance with this exemplary embodiment of the invention this behavior is changed so that at each start of a telecommunication application a logic entity (controller entity, such as a portion of the program code 14A) in the system 10 makes a determination as to whether there is already a SIM Lock flag (F) 14B in place. A special location is reserved for the first USIM with an active SIM Lock. This USIM is then activated first and if this USIM has a SIM Lock then the controller entity sets a flag 14B (with validity data, that may be checked with network time) to indicate that launching of other USIM/ISIM/SIM application is not allowed. The SIM Lock flag 14B can be stored in a secure environment (such as in a secure portion of the memory 14 or elsewhere) and writing to it can be protected.

This controller entity is preferably in a central location and is contacted before launching any SIM/USIM/ISIM application whether these applications are on the same or different physical entities. This restricts the usage of the EF_IMSI file.

This embodiment operates as follows:
1) Start the telecommunication application 1, i.e., USIM1.
2) Wait for the PIN (if needed)
3) Read the EF_IMSI file and validate the SIM Lock of USIM1.
4) Check the flag.
5) If the flag is valid then continue.

Discussed now is SIM unlocking. The controller entity will also be the receiving entity for the SIM Unlocking message. The unlocking mechanism results in the controller entity flag to be reset from indicating the locked condition. The Unlocking message is preferably authenticated such as by the use of an operator certificate or a subscription manager (which could be a smart card vendor or manufacturer) certificate or by some similar means in conjunction with a shared secret. The unlocking can take place by sending an operator signed token to the SIM Lock controller, which validates the signature and then updates the token. In the case of shared secret usage, the SIM lock token can be protected with a shared secret or the shared secret is the token and protected by other means (such as over-the-air encryption). The unlocking for the Multi-SIM would contain information on which USIM/ISIM to unlock, which is not currently done (e.g., see 3GPP TS 22.022). If the shared secret is used, then it is already part of the provisioned USIM application.

It should be noted that the subscription providing server, such as the server 30, may also be hosted by another party (e.g., smart card vendor, phone manufacturer or other service provider) and hence this node's security certificates might be used instead of an operator certificate. As mentioned above, the subscription server 30 may serve to enforce the operator policy, i.e., it may have a record if a SIM lock applies (analogous to the EF_IMSI entry) for this subscription and then, if such is the case, would not provision a new subscription.

By the application of these exemplary embodiments the user is enabled to download other applications without constraint, and can also download other SIMs. However the user is not enabled to activate and use these other applications/SIMs before the contract with the current operator expires.

The use of these exemplary embodiments may provide the same or a similar user experience as in the conventional approach. For example, in conventional practice the user can plug in another SIM card, however this SIM card is not operable (except for making emergency calls).

Figure 2:
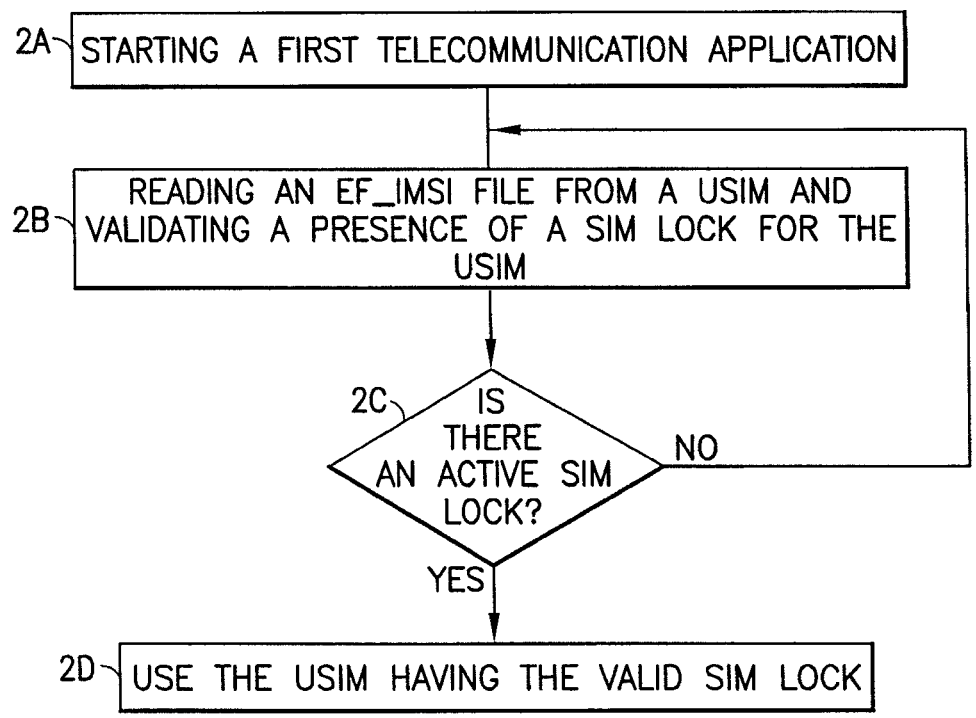
FIG. 2 is a logic flow diagram that illustrates the operation of a method, and a result of execution of computer program instructions embodied on a computer readable medium, in accordance with the exemplary embodiments of this invention.

Referring to FIG. 2, in accordance with a first method the following steps are executed. At Block 2A there is a step of starting a first telecommunication application. At Block 2B there is a step of reading an EF_IMSI file from a first USIM and validating a presence of a SIM Lock of the first USIM. At Block 2C, if there is an active SIM Lock found then the method proceed to Block 2D to use the first USIM. However, if there is no active SIM Lock found then the method proceeds to Block 2E to determine if there is another USIM to check. If there is the method returns to Block 2B to examine a next USIM, otherwise the method proceeds to Block 2F to exit the procedure (all USIMS have been checked and no active SIM Lock was found).

In the method of FIG. 2, and further comprising an additional step prior to Block 2B of receiving a PIN code.

The exemplary embodiments also encompass a non-transitory computer-readable medium that contains software program instructions, where execution of the software program instructions by at least one data processor results in performance of operations that comprise execution of the method of FIG. 2.

The exemplary embodiments of this invention also provide an apparatus that comprises a processor and a memory including computer program code. The memory and computer program code are configured, with the processor, to cause the apparatus at least to start a first telecommunication application, read an EF_IMSI file from a first USIM to validate a presence of a SIM Lock of the first USIM, if there is an active SIM Lock found the first USIM is used, however if there is no active SIM Lock found then the processor examines a next USIM and continues until a USIM having an active SIM Lock is found.

The exemplary embodiments of this invention also provide an apparatus that comprises means for starting a first telecommunication application; means for reading an EF_IMSI file from a first USIM and validating a presence of a SIM Lock of the first USIM; and means, responsive to finding an active SIM Lock, for using use the first USIM. The apparatus further comprises means, responsive, to no active SIM Lock being found, for determining if there is another USIM to check. If there is then the means for reading is activated to examine a next USIM otherwise the apparatus terminates the procedure. In this apparatus the various means can be embodied in the data processor 12 and the memory 14 and program code 14A, in combination with the secure module 18.

In the apparatus of the preceding paragraphs where there are a plurality of USIMs each contained in a separate physical entity, or where there are a plurality of USIMs each contained in a single physical entity.

Figure 3:
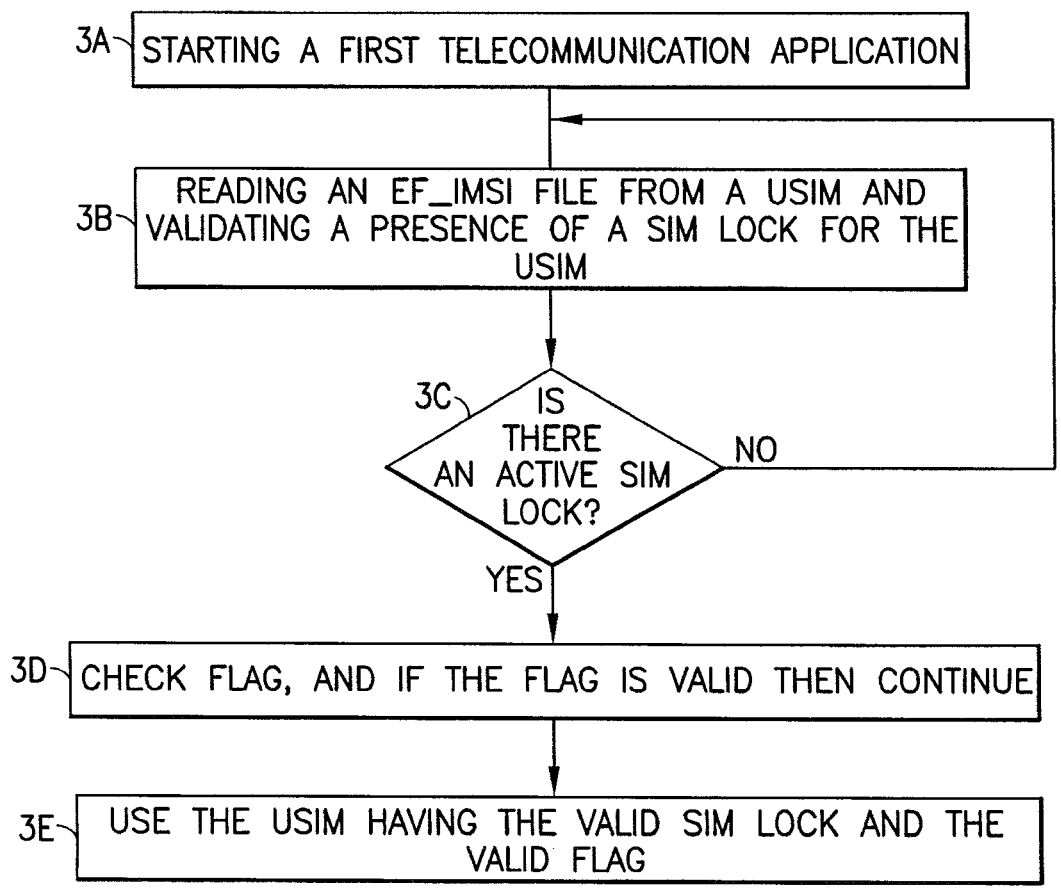
FIG. 3 is a logic flow diagram that illustrates the operation of a method, and a result of execution of computer program instructions embodied on a computer readable medium, further in accordance with the exemplary embodiments of this invention.

Reference is now made to FIG. 3. This method can be similar in some respects to the method of FIG. 2. In FIG. 3 the following steps are executed. At Block 3A there is a step of starting a first telecommunication application. At Block 3B there is a step of reading an EF_IMSI file from a first USIM and validating a presence of a SIM Lock of the first USIM. At Block 3C, if there is an active SIM Lock found then the method proceeds to Block 3D to check the flag to determine if the flag is valid and indicates that the application can be launched. If the flag is found to be valid then the method proceeds to Block 3E to use the USIM. However, if there is no active SIM Lock found at Block 3C then the method proceeds to Block 3F to determine if there is another USIM to check. If there is the method returns to Block 3B to examine a next USIM, otherwise the method proceeds to Block 3G to exit the procedure (all USIMS have been checked and no active SIM Lock was found). At Block 3D, if the flag is not valid, then the application is not executed.

In the method of FIG. 3, and further comprising an additional step prior to Block 3B of receiving a PIN code.

The exemplary embodiments further encompass a non-transitory computer-readable medium that contains software program instructions, where execution of the software program instructions by at least one data processor results in performance of operations that comprise execution of the method of FIG. 3.

The exemplary embodiments of this invention also provide an apparatus that comprises a processor and a memory including computer program code. The memory and computer program code are configured, with the processor, to cause the apparatus at least to start a first telecommunication application and to read an EF_IMSI file from a first USIM and validate a presence of a SIM Lock of the first USIM. If there is an active SIM Lock found then the processor checks a flag to determine if the flag is valid. If the flag is valid then the first USIM is used. However, if there is no active SIM Lock found then the processor examines a next USIM. This procedure is repeated till either a valid SIM lock is found or all USIMs have been examined. If the flag is found not to be valid then the application is not executed.

The exemplary embodiments of this invention also provide an apparatus that comprises means for starting a first telecommunication application; means for reading an EF_IMSI file from a first USIM and validating a presence of a SIM Lock of the first USIM; and means, responsive to finding an active SIM Lock, for checking a flag to determine if the flag is valid. If the flag is valid then the USIM can be used, otherwise if the flag is found not be valid then the application is not executed. The apparatus further comprises means, responsive, to no active SIM Lock being found, for determining if there is another USIM to check. If there is then the means for reading is activated to examine a next USIM otherwise the apparatus terminates the procedure. In this apparatus the various means can be embodied in the data processor 12 and the memory 14 and program code 14A, in combination with the secure module 18.

In the apparatus of the preceding paragraphs where there are a plurality of USIMs each contained in a separate physical entity, or where there are a plurality of USIMs each contained in a single physical entity.

In these various embodiments a USIM is understood to be or represent a set of access credentials for a cellular network and related data, and thus the embodiments of this invention also encompass the use of ISIM, SIM, CSIM and similar type of modules and credentials.

In the foregoing description of FIG. 2 and FIG. 3 there can also be a step of implementing an unlocking mechanism to remove the SIM Lock, where an Unlocking message is authenticated by the use of a certificate and a shared secret.

The foregoing description has provided by way of exemplary and non-limiting examples a full and informative description of various method, apparatus and computer program software for implementing the exemplary embodiments of this invention. However, various modifications and adaptations may become apparent to those skilled in the relevant arts in view of the foregoing description, when read in conjunction with the accompanying drawings and the appended claims. As but some examples, the use of other similar or equivalent methods and method steps may be attempted by those skilled in the art. However, all such and similar modifications of the teachings of this invention will still fall within the scope of the embodiments of this invention.

Furthermore, some of the features of the exemplary embodiments of this invention may be used to advantage without the corresponding use of other features. As such, the foregoing description should be considered as merely illustrative of the principles, teachings and embodiments of this invention, and not in limitation thereof.

What is claimed is:

1. A method, comprising:
   starting an application in a wireless communication device;
   reading a file from a first subscriber module and determining if there is an active subscriber module lock of the first subscriber module, where an active subscriber module lock is indicative of a presence of an active contractual obligation with an operator that is associated with the subscriber module;
   if it is determined that there is an active subscriber module lock of the first subscriber module then executing the application using the first subscriber module;
   else, if it is determined that there is not an active subscriber module lock of the first subscriber module, then determining if there is an active subscriber module lock of a second subscriber module and continuing until an active subscriber module lock of another subscriber module is determined, and then executing the application using that subscriber module having the active subscriber module lock, otherwise terminating the method without executing the application if no active subscriber module lock of any other subscriber module is determined to be present.

2. The method as in claim 1, where reading a file is performed after receiving a personal identification number of a user of the wireless communication device.

3. The method as in claim 1, where the file is comprised of an elementary file.

4. The method of claim 1, where if it is determined that there is an active subscriber module lock of the first subscriber module, further comprising checking for a presence of an associated valid flag, and executing the application using the first subscriber module only if the associated valid flag is found, where the valid flag is stored in a secure portion of a memory device.

5. The method as in claim 1, further comprising removing an active subscriber module lock in response to authenticating a received unlocking message.

6. The method as in claim 5, where authenticating the received unlocking message comprises use of a certificate and a shared secret.

7. The method as in claim 1, where the subscriber module is one of a subscriber identity module, a universal subscriber identity module, an international subscriber identity module, or a code division multiple access subscriber identity module.

8. The method as in claim 1, where at least the first subscriber module and the second subscriber module are contained within one secure module that is coupled with the wireless communication device.

9. The method as in claim 1, where the method is executed at least partially in cooperation with a subscription server that is external to the wireless communication device.

10. The method as in claim 9, where the subscription server operates to enforce an operator's policy with respect to a subscription lock.

11. A non-transitory computer-readable medium that contains software program instructions, where execution of the software program instructions by at least one data processor results in performance of operations that comprise execution of the method of claim 1.

12. An apparatus, comprising:
   a processor and a memory including computer program code, where the memory and computer program code are configured, with the processor, to cause the apparatus at least to start an application in a wireless communication device; to read a file from a first subscriber module and to determine if there is an active subscriber module lock of the first subscriber module, where an active subscriber module lock is indicative of a presence of an active contractual obligation with an operator that is associated with the subscriber module; in response to determining that there is an active subscriber module lock of the first subscriber module executing the application using the first subscriber module; otherwise if it is determined that there is not an active subscriber module lock of the first subscriber module, to determine if there is an active subscriber module lock of a second subscriber module and continuing until an active subscriber module lock of another subscriber module is determined, and then using executing the application using that subscriber module having the active subscriber module lock, otherwise terminating the method without executing the application if no active subscriber module lock of any other subscriber module is determined to be present.

13. The apparatus as in claim 12, where the memory and computer program code are further configured, with the processor, to read the file in response to receiving a personal identification number of a user of the wireless communication device.

14. The apparatus as in claim 12, where the file is comprised of an elementary file.

15. The apparatus of claim 12, where the memory and computer program code are further configured, with the processor, if it is determined that there is an active subscriber module lock of the first subscriber module, to check for a presence of an associated valid flag, and to execute the application using the first subscriber module only if the associated valid flag is found, where the valid flag is stored in a secure portion of a memory device.

16. The apparatus as in claim 12, where the memory and computer program code are further configured, with the processor, to remove an active subscriber module lock in response to authenticating a received unlocking message.

17. The apparatus as in claim 16, where authenticating the received unlocking message comprises use of a certificate and a shared secret.

18. The apparatus as in claim 12, where the subscriber module is one of a subscriber identity module, a universal subscriber identity module, an international subscriber identity module, or a code division multiple access subscriber identity module.

19. The apparatus as in claim 12, where at least the first subscriber module and the second subscriber module are contained within one secure module that is coupled with the wireless communication device.

20. The apparatus as in claim 12, where the memory and computer program code are further configured, with the processor, to operate at least partially in cooperation with a subscription server that is external to the wireless communication device.

21. The apparatus as in claim 20, where the subscription server operates to enforce an operator's policy with respect to a subscription lock.

* * * * *